March 2, 1943.　　　　G. SCHMAL　　　　2,312,736
SHOVEL
Filed June 19, 1942
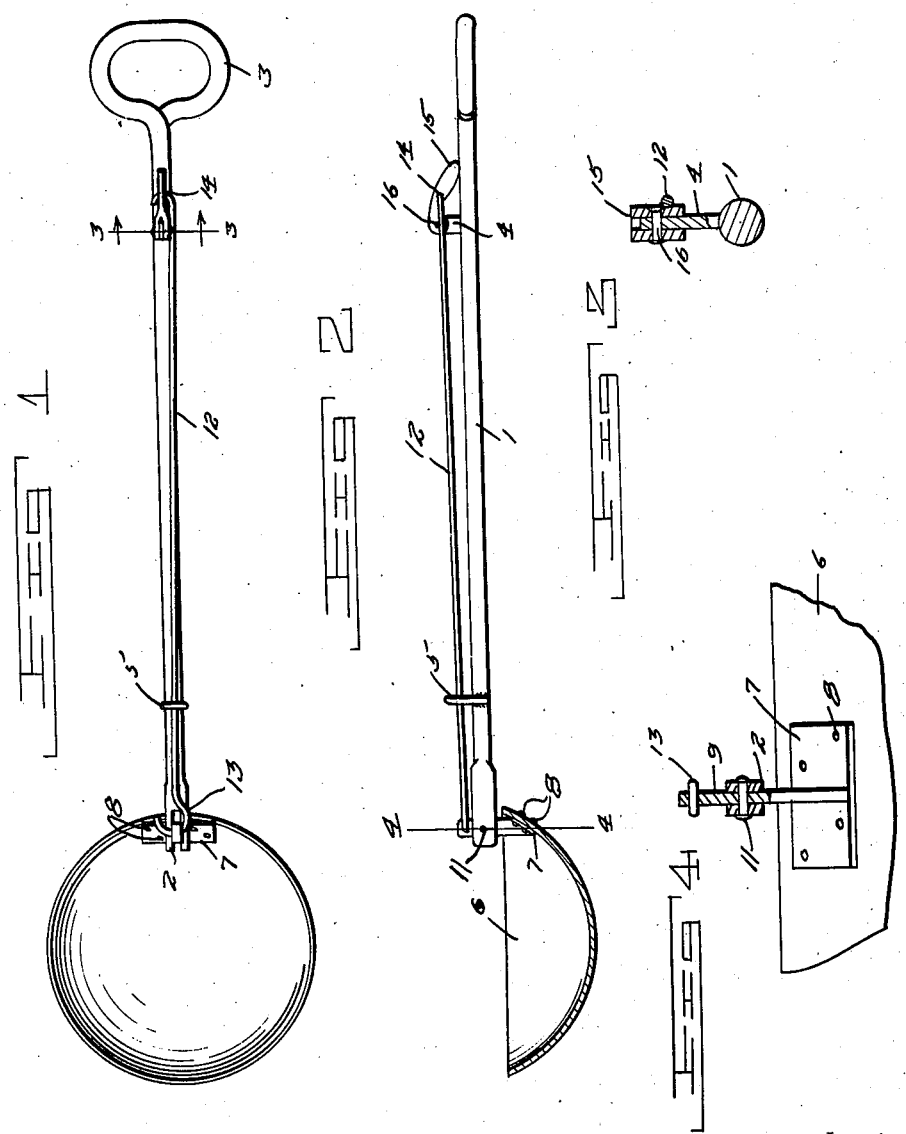
Inventor
George Schmal
By Clarence A. O'Brien
and Harvey B. Jacobson, Attorneys Patented Mar. 2, 1943

2,312,736

UNITED STATES PATENT OFFICE 2,312,736

SHOVEL

George Schmal, North Platte, Nebr.

Application June 19, 1942, Serial No. 447,691

2 Claims. (Cl. 294—55)

My invention relates to improvements in shovels, the principal object in view being to provide a simply constructed, strong and inexpensive device of this character for cleaning out fine ash from the fire pots of stoker furnaces which, because of rounded contours, are difficult to clean out with the ordinary shovel.

Other and subordinate objects are also comprehended by my invention, all of which, together with the precise nature of my improvements, will be readily understood when the succeeding description and claims are read with reference to the drawing accompanying and forming part of this specification.

In said drawing:

Figure 1 is a view in plan of my improved shovel in its preferred embodiment,

Figure 2 is a view in side elevation with the scoop shown in section,

Figure 3 is a view in transverse section taken on line 3—3 of Figure 1 and drawn to an enlarged scale, and Figure 4 is a fragmentary view in section taken on the line 4—4 of Figure 2.

Referring to the drawing by numerals, in its preferred embodiment, my improved shovel comprises a straight-type, short handle 1 having a bifurcated front end 2, and a loop-type hand grip 3 at the rear end thereof. A short lug 4 is provided on top of the handle adjacent the hand grip 3 in upstanding position, and an upstanding guide loop 5 adjacent the bifurcated end 2, each for a purpose presently apparent.

A bowl-like transversely arcuate scoop 6 is mounted, as presently described, at the front end of the handle 1 for swinging movement upwardly and downwardly relative to said handle. The mounting for the scoop 6 comprises a T-shaped bracket having a plate-like base 7 riveted, as at 8, to the scoop 6 inside the same adjacent the rim thereof and to extend lengthwise along said rim. A central bar-like shank 9 extends from the base 7 of said bracket upwardly out of the scoop at a right angle to the plane in which the rim of the bowl 6 lies, said shank extending upwardly through the bifurcated end 2 of the handle 1 and being pivoted, as at 11, to said end so that the scoop may be swung about an axis transversely to the longitudinal axis of the handle 1.

A scoop operating rod 12 is pivotally connected, as at 13, to the upper end of the shank 9, above the handle 1, and extends rearwardly along the handle 1 through the guide loop 3. The rear end of the operating rod 12 is pivotaly connected, as at 14, to a short hand lever 15 intermediate the ends of the latter. The hand lever is pivoted at one end thereof, as at 16, to the upper end of the lug 4 so that it may be swung downwardly against the handle 1 to position the pivot point 14 below the pivot point 16 and thereby provide an overthrow dead center lock preventing forward movement of the operating rod 12 to hold the scoop extended forwardly of the handle 1.

Obviously, by swinging the hand lever 15 from the described locking position, the scoop 6 may be permitted, under the influence of gravity, to assume any described angular position relative to the handle and suitable for scooping up ashes, and when a load has been piled up in the scoop, the latter may be swung forwardly by pull on the operating rod 12 to normal position, as shown in Figures 1 and 2, for dumping of the contents of the scoop as desired. As will be understood, the shape of the scoop 6 adapts the same to fit into rounded parts of the fire pots of the type of furnaces mentioned.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the subjoined claims.

What I claim is:

1. A shovel comprising a straight handle having a bifurcated front end, a bowl-like scoop having a flat shank extending out of the same at one side thereof, said shank being pivoted in said end of the handle for swinging about an axis transverse to that of the handle to swing said scoop forwardly and rearwardly about said transverse axis, and manipulative means to swing said shank comprising a pull rod pivoted to said shank and extending rearwardly along said handle, and a hand lever pivoted on said handle and pivotally connected to said rod.

2. A shovel comprising a straight handle having a bifurcated front end, a bowl-like scoop having a flat shank extending out of the same at one side thereof, said shank being pivoted in said end of the handle for swinging about an axis transverse to that of the handle to swing said scoop forwardly and rearwardly about said transverse axis, and manipulative means to swing said shank comprising a pull rod pivoted to said shank and extending rearwardly along said handle, and a hand lever pivoted on said handle and pivotally connected to said rod, said lever being swingable on the pivot thereof into an overthrow dead center locking position against said handle.

GEORGE SCHMAL.